June 26, 1951        J. V. HART        2,558,683
AUDIBLE INDICATING MEASURING APPARATUS
Filed May 30, 1945        2 Sheets-Sheet 1
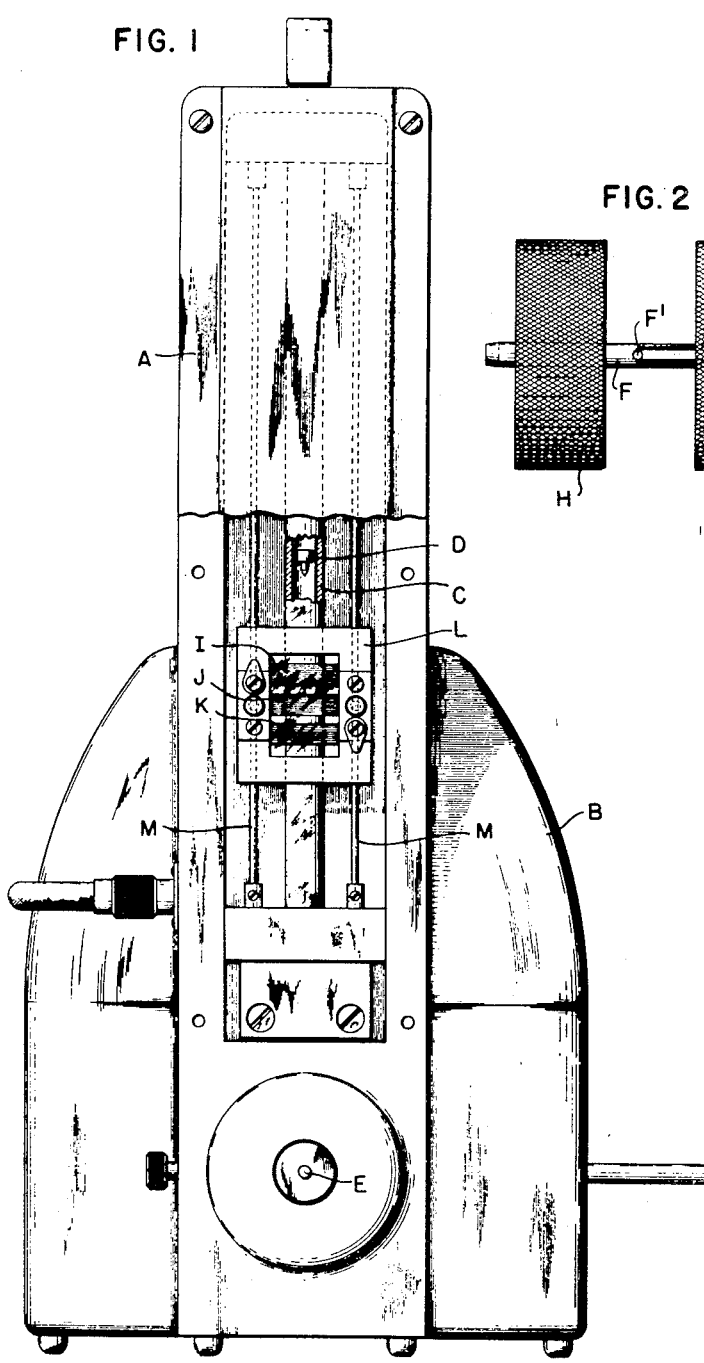
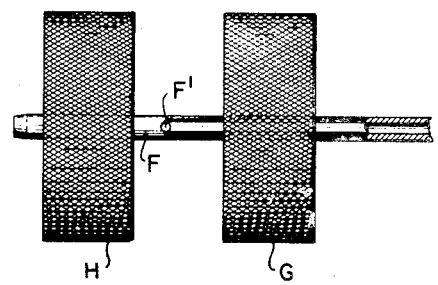
*INVENTOR.*
JOHN V. HART
BY
*ATTORNEY.*

INVENTOR.
JOHN V. HART
BY
CB Spangenberg
ATTORNEY.

Patented June 26, 1951

2,558,683

UNITED STATES PATENT OFFICE 2,558,683

AUDIBLE INDICATING MEASURING APPARATUS

John V. Hart, Upper Darby, Pa., assignor, by mesne assignments, to Minneapolis-Honeywell Regulator Company, Minneapolis, Minn., a corporation of Delaware Application May 30, 1945, Serial No. 596,701

2 Claims. (Cl. 73—37.5)

The present invention relates to measuring apparatus or devices of the type comprising means for adjusting a movable body into different positions along a path of movement in accordance with varying values of the quantity measured, and the general object of the present invention is to provide such a measuring device with practically effective means audibly indicating the results of its measuring operations.

More specifically, the object of the invention is to combine relatively simple and effective electronic devices and associated circuit elements with a measuring device of the above specified type and with a sound creating device of the loud speaker type to provide audible indications of the relation of the actual value of the quantity measured to a predetermined or desired value of the said quantity.

In the preferred form of the present invention an inductive winding is distributed along the path of movement of said movable body and the latter is of such character that its adjustment along said winding will vary the inductance of the latter. Said winding is connected into an oscillating circuit so that the changes in the inductance of said winding produced by changes in the position of said body will cause said oscillating circuit to oscillate with a frequency varying with the position of said body along a portion of its path of movement which may be called the sounding range. The said oscillating circuit is combined with a second circuit oscillating with a predetermined constant frequency which may be that at which the first mentioned circuit oscillates when said body is at either end of its sounding range. The two oscillating circuits are associated or combined with a loud speaker to impress a beat frequency in the audible range on the loud speaker when the oscillation frequencies of the two oscillating circuits differ. Apparatus of the character described may advantageously be arranged so that the beat frequency will vary from zero to a maximum as the body moves from either end of its sounding range to an optimum intermediate position.

The present invention was devised with the specific purpose in mind of enabling blind persons to perform certain gauging operations for which they have been heretofore unfitted because said operations required visual observation of the position of a movable indicating or measuring element. The invention may be used with advantage, however, by persons having good eyesight in effecting measuring operations which are necessarily or advantageously carried out in such manner as to make it difficult or impossible for the operator to visually determine the position of a body deflecting in accordance with variations in the quantity measured.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described a preferred embodiment of the invention.

Of the drawings:

Fig. 1 is an elevation, with parts broken away, of a gauging device;

Fig. 2 is an elevation partly in section illustrating a use of the device shown in Fig. 1.

Figure 3:
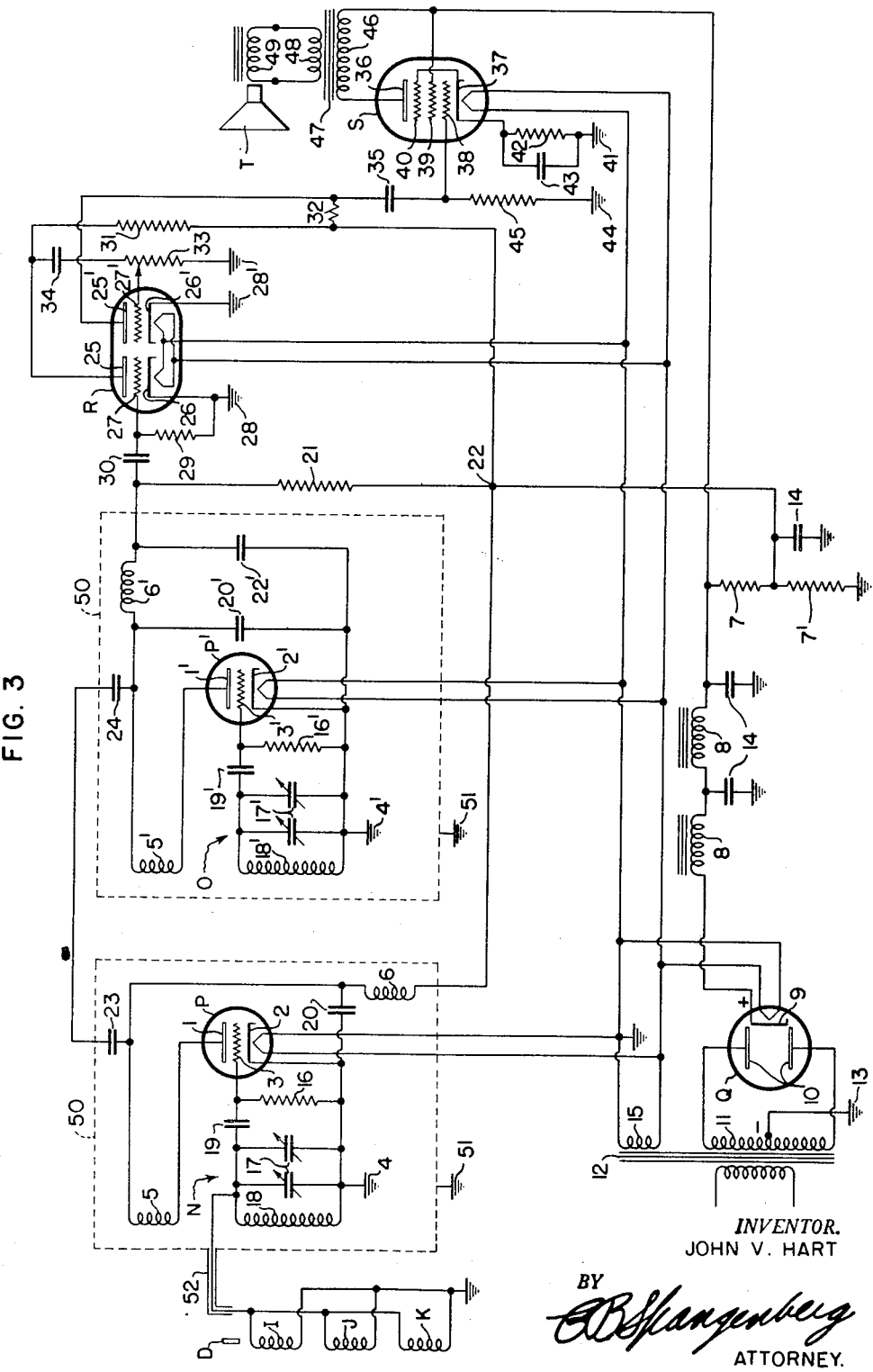
Fig. 3 is a diagram illustrating a sound producing means associated with the apparatus shown in Figs. 1 and 2.

In the drawings I have illustrated, by way of example, the use of the present invention with a pressure gauge A of known type comprising a reservoir B containing air under pressure, a vertical glass tube C increasing in its internal diameter from its lower to its upper end, and a deflecting element D in the tube and having a cross-section only slightly less than the internal diameter of the tube at the lower end of the latter. The element D may consist of or comprise a body of metal which may be a good conducting non-magnetic metal, but ordinarily is a magnetic metal such as iron. The element D is adapted to float in the tube at different levels as the rate of air flow through the tube C is varied. The tube C forms part of a flow path through which air passes from the reservoir B to the lower end of the tube C and through the latter to the upper end thereof and thence to the inlet end of a pipe E supplying air to a gauging element F. The latter may take various forms, and, in particular, may be a hollow cylinder for use in gauging the diameter of a rod or the like over which the cylindrical gauge is passed. Alternatively, and as shown, the gauge may be, in effect, a pipe section or tubular gauging spindle F inserted in the bore of a bushing or analogous part to determine the diameter of said bore. The gauging spindle F shown has a fluted outer wall surface, and is formed with one or more outlet ports F', which ordinarily have their axes radial to the same point in the axis of the gauging element.

In Fig. 2, G designates a bushing or like part, the internal diameter of which is to be gauged by the use of the gauging spindle F. In the gauging operation, the gauging spindle extends through the bushing G with its radial outlet ports F″ approximately midway between the ends of F″ approximately midway between the cross section should be only slightly less than the cross section of the passage through the part G. In consequence, any variation in the internal diameter of the bushing G will produce a corresponding variation in the rate of air flow to the atmosphere through the clearance space between the spindle F and bushing, and through the tube C. With air supplied at a suitable and approximately constant pressure, the variations in the velocity of air flow due to variations in bushing bore diameter, will cause the measuring body or element D to float at different levels. For each velocity of air flow through the tube C, the level of the element D will be that at which the pressure drop in the air flowing through the annular space between the tube C and the element D is such that the upward pressure of the air against the underside of the element D exceeds the downward pressure of the air against the upper side of the element by an amount equal to the weight of the element D. The latter therefore floats in the air stream at a level which rises and falls as the clearance space between the bushing G and the gauging spindle F increases and decreases.

For many gauging purposes, it is practically advantageous to employ a standard part identical in form with the test body to be gauged when the latter is perfect in form and dimensions. In Fig. 2, H represents such a standard piece which is mounted on the gauge spindle F alongside the test piece G so that the test and standard pieces may be alternately positioned centrally over the discharge openings F″ of the spindle to permit the respective air flows through the tube C to be readily compared. Further description herein of the construction and operation of the gauge mechanism shown in Figs. 1 and 2 is unnecessary because they are not novel with me but are shown as of a type and form fully disclosed in the Aller Patent No. 2,370,219, dated February 27, 1945.

As is explained in the Aller patent, the position assumed by the element D, for any particular clearance between the gauge element F and the object H, may be varied by varying the pressure at which air is supplied by the tank B, and by providing a by-pass about the tube C so that a regulable fraction of air passing to the gauging element does not pass through the tube C.

In the illustrated form of the present invention three inductive winding sections or coils I, J and K are mounted in the gauge A so as to surround the tube C at slightly displaced levels intermediate the upper and lower ends of the tube. As shown, the coils I, J and K are mounted in a vertically adjustable frame L which is mounted on and supported by vertical rods M adjacent the tube C. The capacity for vertical adjustment of the frame L facilitates the calibration or adjustment of the gauging apparatus for use in a particular gauging operation, so that when the clearance space between the gauging element and the test object G is that desired, the element D will be within and directly surrounded by the middle coil J. When the clearance space is slightly less or slightly greater than is desired, the element D may then be within and directly surrounded by the coil K or I.

The oscillating circuits and loud speaker mechanism and circuit provisions with which the coils I, J and K are associated in accordance with the present invention, may be of old and well known types. One suitable arrangement of such circuits and mechanism is shown diagrammatically, by way of example, in Fig. 3. As shown in Fig. 3 the coils I, J and K are connected to and constitute a part of an oscillating circuit N which without said coils would be a conventional oscillating circuit. As shown, the oscillating circuit N includes an electronic valve P in the form of a triode having a plate 1, a cathode 2 and a control grid 3. The cathode 2 is connected to ground at 4 and the anode 1 is connected to ground at 13 through a plate circuit branch including an inductive coil 5, an inductance 6, a resistance 7, two filter coils 8 and the cathode 9 of a full-wave rectifier tube Q which has its anodes 10 connected to the opposite terminals of the secondary winding 11 of a transformer 12, the midpoint of the winding being connected to ground at 13. The plate circuit for the tube P is thus completed through the ground connections 4 and 13. The portion of the plate circuit between the inductance 6 and resistance 7 is connected to ground by a resistance 7′ and a condenser 14 in parallel with the resistance 7′. Each terminal of one of the filter coils 8 is also connected to ground by a corresponding condenser 14. The transformer 12 has a secondary coil 15 which supplies heating current to the heating filaments of the electronic tubes P and Q and to the heating filaments of the hereinafter mentioned electronic tubes P′, R and S.

The cathode 2 of tube P is connected to the control grid 3 of the tube by a resistance 16 and by a shunt including the tank circuit of the oscillating circuit N. Said shunt includes two variable condensers 17 and an inductive winding 18, each in parallel with the others, and each connected at one end to the cathode 2. The opposite ends of the condensers 17 and inductive winding 18 are connected to the control grid 3 by a condenser 19. The coil 5 serves as a so-called "tickler" coil which is associated with the inductive winding 18 to form the electromagnetic coupling between the plate and grid circuits of the tube P required to maintain the circuit N in oscillation.

The measuring instrument coils I, J and K are shown as connected in parallel with one another, with one terminal of each connected to ground and with the second terminal of each connected to the control grid 3 of the tube P through the condenser 19. With the arrangement shown, the coils I, J and K are thus connected in parallel with the winding 18 to collectively provide the inductance in the tank circuit portion of the oscillating circuit N.

The movable measuring element D cooperates with the coils I, J and K to vary the inductance which they collectively provide for the oscillating circuit N. In practice when the element D is sufficiently displaced from the windings I, J and K, either downward or upward as seen in Fig. 3, so that it does not significantly modify the inductance of said coils, the circuit N will have a normal oscillation frequency of suitable value which, for example, may be a frequency of 2000 kc. per second. As the member D moves into inductive relation with the coils I, J and K their aggregate inductance increases to a maximum. As the inductance of the oscillating circuit N is thus increased the frequency of oscillation diminishes in a manner and to a minimum determined by the circuit constants.

The second oscillating circuit O is also shown as a conventional oscillating circuit of the same type as circuit N comprising a tube P' and parts 1', 2', 3', 4', 5', 6', 16', 17', 18', 19', and 20' which correspond to the tube P and parts 1, 2, 3, 4, 5, 6, 16, 17, 18, 19, and 20 respectively, of the circuit N.

For the purposes of the present invention, the oscillating circuit O which includes nothing corresponding to the coils I, J and K, should have such inductance and capacitance that the circuit O will oscillate with a constant frequency which is the same as the normal frequency of the circuit N. Thus when the normal frequency of circuit N is 2000 kc. per second, the constant oscillation frequency of the circuit O should be 2000 kc. per second.

The plate circuit of the tube P' includes a resistance 21 which connects the terminal of the inductance 6' remote from the anode 1' to a point 22 in the plate circuit of the tube P. The point 22 is the portion of the last mentioned plate circuit which connects the inductance 6 to the resistances 7 and 7'. The cathode of the tube P' is connected to the portion of the plate circuit of that tube between the inductance 6' and resistance 21 by a condenser 22'. The plate circuits of the tubes P and P' are also coupled by means of condensers 23 and 24, connected in series between a point in the plate circuit of the tube P intermediate inductances 5 and 6 and a point in the plate circuit of the tube P' between the inductances 5' and 6'.

With the oscillating circuits N and O properly formed and connected as described and oscillating with different frequencies, a beat frequency oscillation of audio frequency is maintained in a beat frequency circuit including the condensers 23 and 24, inductance 6', resistance 21 and inductance 6. The arrangement shown in Fig. 3 comprises means including a tube R for two stage amplification of the beat frequency voltage, and means for impressing the voltage amplifier output on a tube S employed to drive the loud speaker T.

As shown in Fig. 3, the tube R is a twin triode, one valve element of which comprises an anode 25, a cathode 26 and a control grid 27. The cathode 26 is connected to ground at 28 and is connected to the control grid 27 by a resistance 29. The control grid 27 is connected by a condenser 30 to the beat frequency oscillation circuit between the inductance 6' and resistance 21. The plate circuit including the anode 25 and cathode 26 includes a resistance 31 connected between the anode 25 and the circuit point 22. The second valve element in tube R comprises an anode 25', a cathode 26' and a control grid 27'. The cathode 26' is connected to ground at 28'. The plate circuit of the last mentioned element includes a resistance 32 through which the anode 25' is connected to the circuit point 22. The control grid 27' is connected to a resistance 33 at a variable point along the length of the latter. The resistance 33 has one terminal connected to ground and has its other terminal connected by a condenser 34 to the anode 25. The plate circuits of the two valve elements of the tube R include a common portion between the point 22 and ground 13, which is also common to the plate circuits of tubes P and P'.

The plate circuit of the valve element of the tube R including resistance 32 is connected by a condenser 35 to the control grid 38 of the tube S. The latter, as shown, is a pentode comprising an anode 36, a cathode 37, a control grid 38, a screen grid 39 and a suppressor 40. The cathode 37 is connected to ground at 41 through a resistance 42 and a condenser 43 in parallel with the resistance 42. The control grid 38 is connected to ground at 44 through a resistance 45. The plate circuit of the tube S includes the primary winding 46 of a transformer 47, and includes the filter windings 8, cathode 9, anodes 10, and the transformer winding 11 with its center tap connection to ground at 13. The secondary coil 48 of the transformer 47 is connected to and energizes the actuating winding 49 of the electro-magnetic noise-producing element of the loud speaker T.

As shown, the oscillating circuits are provided with separate electro-static shields 50, each with a separate ground connection 51. The conductor connecting the coils I, J, and K to the oscillating circuit N is also provided with a shield 52 which is connected to the shield 50 of the oscillating circuit N. As will be apparent, the values of the resistances, inductances, capacitances and the characteristics of the various electronic tubes included in the circuit arrangement shown in Fig. 3 may vary widely with conditions of use and the choice of the designer, and can be readily selected and related, by those skilled in the art, to adapt them for their intended use.

In the contemplated use of the apparatus shown, each gauging operation will include movement of the test element G longitudinally of the spindle F through its center position relative to the spindle outflow port or ports F'. In its center position the test piece reduces the outflow through the port or ports F' to the minimum obtainable with the existing instrument calibration and with the particular dimensions of the test piece. As the test piece is moved to increase or decrease the outflow of air through the port or ports F', the velocity of air flow upward through the tube C correspondingly increases or decreases and thereby causes the element D to float at a higher or lower level in the tube C.

Normally, the apparatus is so calibrated and adjusted that when both the test piece G and the standard piece H are removed from the spindle F, the element D will float at its highest level and that when the test piece is of proper size and is in its center position, the element D will float at the level at which it is centered in the coil section J. When the element D is so centered, the inductance of the winding comprising the sections I, J, and K is at a maximum and the beat frequency is also at a maximum. In consequence, the pitch of the sound emitted by the loud speaker T will then be at a maximum. Movement of the element D away from its center position in coil J in either direction will reduce the pitch of the loud speaker noise. If the diameter of the passage in the test piece G is oversize, the element D will be above its center position and when the diameter of the test piece is undersize the element D will be below its center position.

In consequence, the pitch of the whistling sound emitted by the loud speaker T may be utilized as an indication of the internal diameter of the test piece G. That is to say, if upon movement of the test piece G into its center position on spindle F, the pitch of the whistling sound quickly increases to a maximum and then as quickly decreases to a minimum, it will be known that the test piece G is undersize. This sharp whistle of short duration is caused by the element D passing quickly through the coil sections I, J, and K from its higest position to a position beneath the coils. On the other hand, if upon movement of the test piece G into its center position the sound emitted increases to a maximum and then decreases somewhat, it will be known that the element D has passed through the coil sections K and J and has come to rest below the center coil section J somewhere within the region of coil section K, thus indicating that the test piece G is undersize but not to such a great extent as in the first instance mentioned. If upon movement of the test piece G into its center position a noise of low pitch only is produced, it will be known that the test piece G is slightly oversize inasmuch as a low pitched noise alone can be produced only by the element D dropping to a level adjacent the coil section I but not dropping to the center of coil section J. When the noise emitted increases to and is maintained at the highest pitch upon movement of the test piece G into its center position, this indicates that the element D has dropped to the level at which it is centered in the coil section J, and accordingly, that the test piece G is of proper size.

An ordinary operator gauging a series of test pieces may thus quickly learn to determine from the pitch and the changes in pitch of the sound emitted by the loud speaker T whether a particular test piece is undersize, oversize or of desired size, and if undersize or oversize, whether it is within the prescribed tolerance limitation. For example, the test piece may be within the prescribed tolerance limitation whenever the element D assumes a level adjacent the coil sections I and K.

To provide a check on the operator's determination of test piece dimensions from the maximum sound pitch obtainable in a gauging operation, use may advantageously be made of a standard part H of which the test piece G will be a facsimile if it has the precise form and dimensions desired. In use, the standard test pieces H and G are mounted side by side on the gauging spindle F, as shown in Fig. 2. Then alternately moving each of the standard and test pieces through its center position on the gauge spindle, any operator whose hearing is not unduly impaired can quickly determine whether the test piece is of the desired size, undersize or oversize, and if not of the proper size, whether it is within the tolerance limits.

If considered desirable, the spindle F or analogous gauging element may be provided with means through which a blind operator can determine by his sense of touch when a test piece is in its center position.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. A testing apparatus comprising a metal body deflecting along a path in response to variations in a condition under test, means for producing a progressively varying, audible signal selectively indicative of the varying positions of said body as the latter moves toward or away from a predetermined, normal, intermediate position in said path, comprising an oscillating circuit including a winding alongside said path and distributed longitudinally thereof and in position to have its reactance progressively modified by said body as the latter moves along said path, to thereby vary the oscillation frequency of said oscillating circuit, a loud speaker having an electric energizing circuit and adapted to emit sound which progressively varies in character as the frequency of current flow in said energizing circuit varies, and means connected in the output portion of said oscillating circuit for creating a current flow in said energizing circuit varying in frequency in selective accordance with variations in the frequency of oscillation of said oscillating circuit.

2. A measuring apparatus combination including a vertical tube increasing in diameter from its bottom upward, means for conducting fluid upward through said tube at a rate varying with and dependent on the value of a quantity measured, means comprising an oscillating circuit including a winding surrounding said tube and distributed longitudinally thereof, a deflecting element in said tube and moved longitudinally thereof to a position which is dependent on the rate of fluid flow through said tube and adapted to modify the inductance of said winding by its movement into different positions and thereby vary the oscillation frequency of said circuit, a loud speaker having an electric energizing circuit and adapted to emit sound which varies in character as the frequency of current flow in said energizing circuit varies, and means connected in the output portion of said oscillating circuit for creating a current flow in said energizing circuit varying in frequency in selective accordance with variations in the frequency of oscillation of said oscillating circuit.

JOHN V. HART.

REFERENCES CITED

The following references are of record in the file of this patent:

UNITED STATES PATENTS

| Number | Name | Date |
|---|---|---|
| 549,444 | Dailey | Nov. 5, 1895 |
| 763,011 | Mietaschk | June 21, 1904 |
| 1,780,952 | Symmes | Nov. 11, 1930 |
| 1,927,750 | Mennesson | Sept. 19, 1933 |
| 2,001,447 | Balsiger | May 14, 1935 |
| 2,045,970 | Stein | June 30, 1936 |
| 2,051,258 | Hunt | Aug. 18, 1936 |
| 2,280,678 | Waymouth | Apr. 21, 1942 |
| 2,337,608 | Hulsberg | Dec. 28, 1943 |
| 2,370,219 | Aller | Feb. 27, 1945 |
| 2,383,321 | Kleber | Aug. 21, 1945 |
| 2,387,496 | Cornelius | Oct. 23, 1945 |

FOREIGN PATENTS

| Number | Country | Date |
|---|---|---|
| 341,365 | Great Britain | Jan. 15, 1931 |